United States Patent Office 3,325,011
Patented June 13, 1967

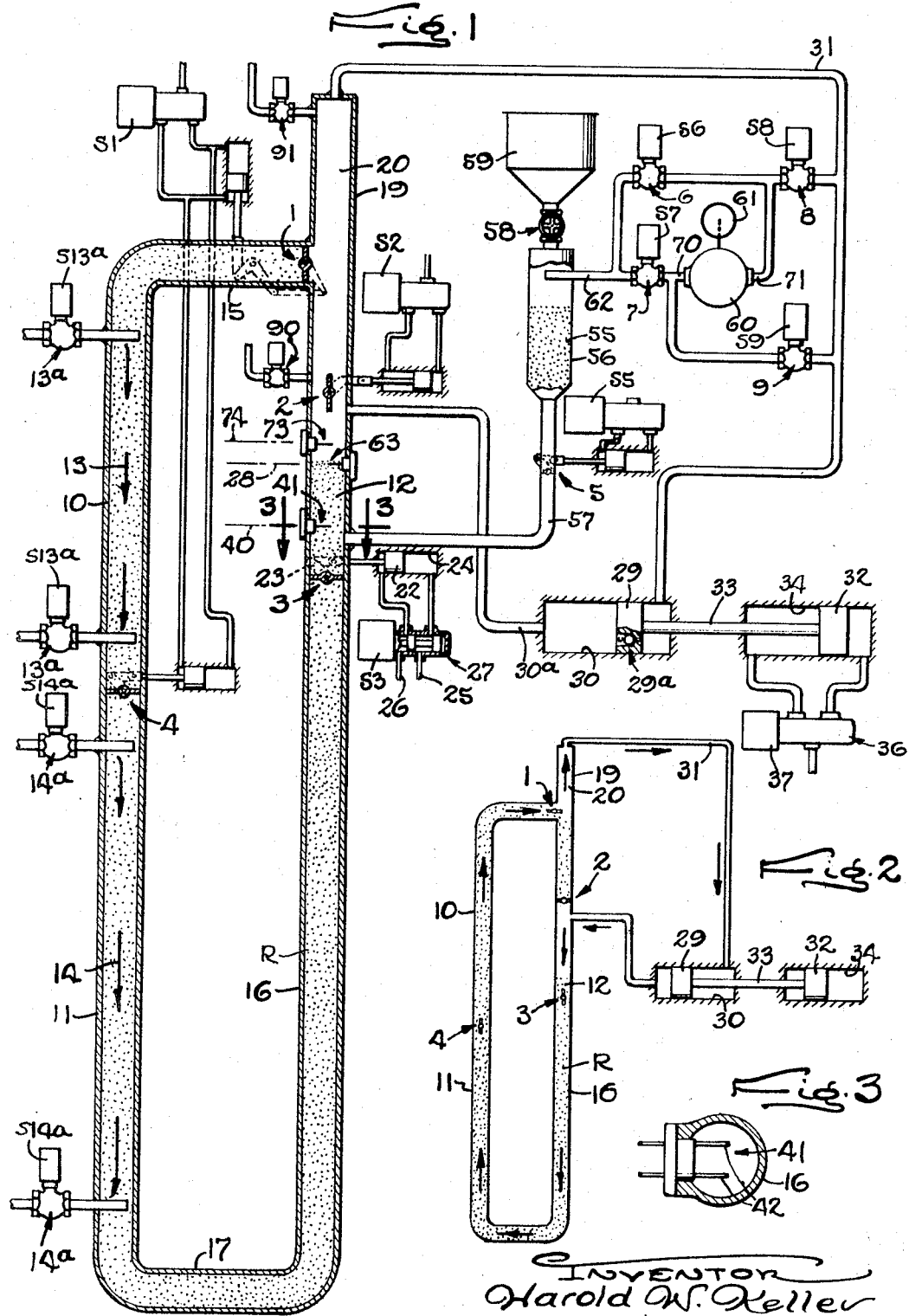

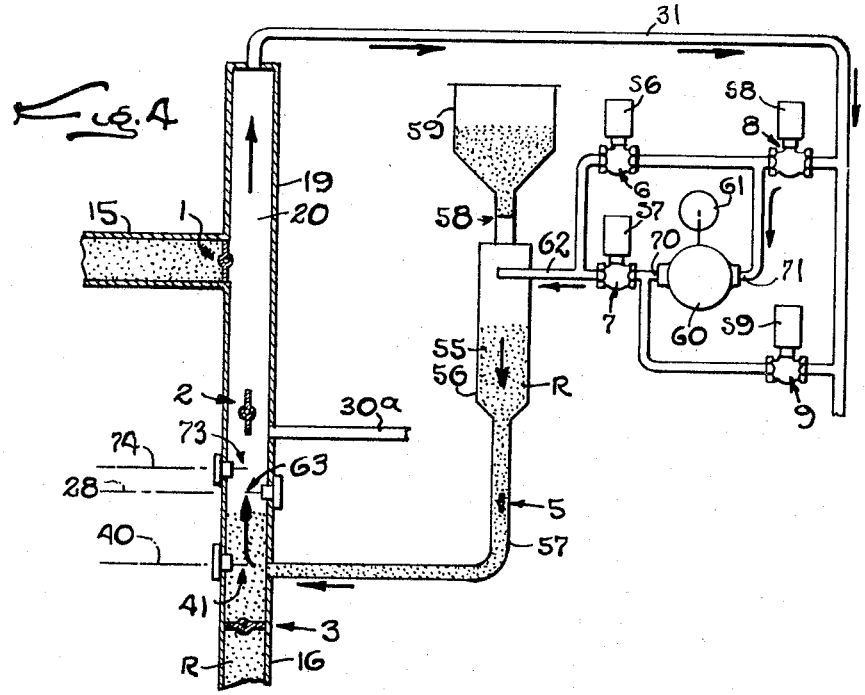
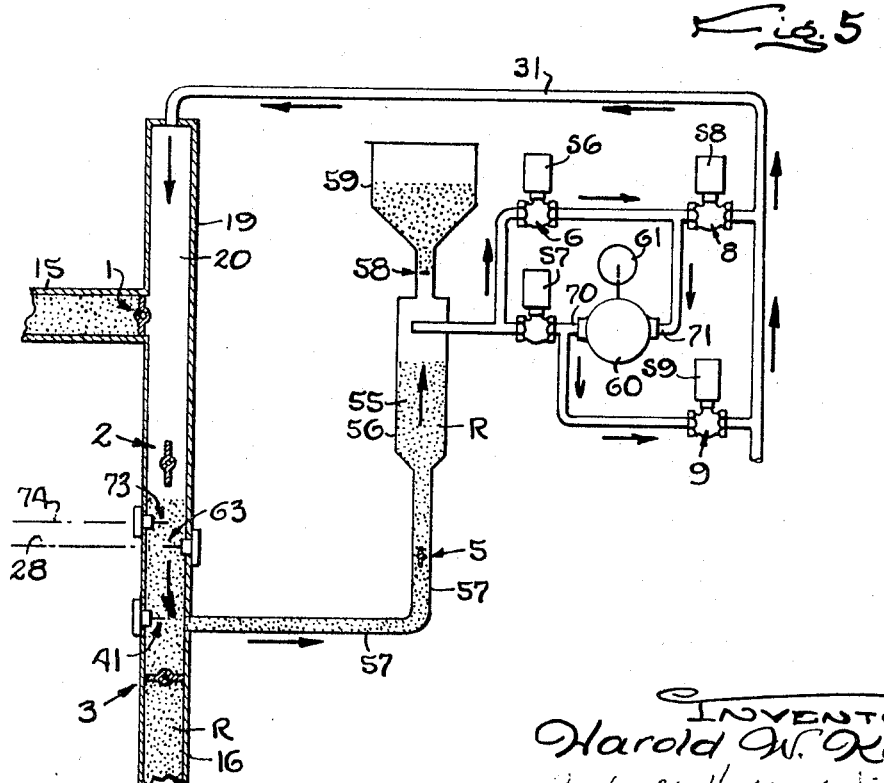

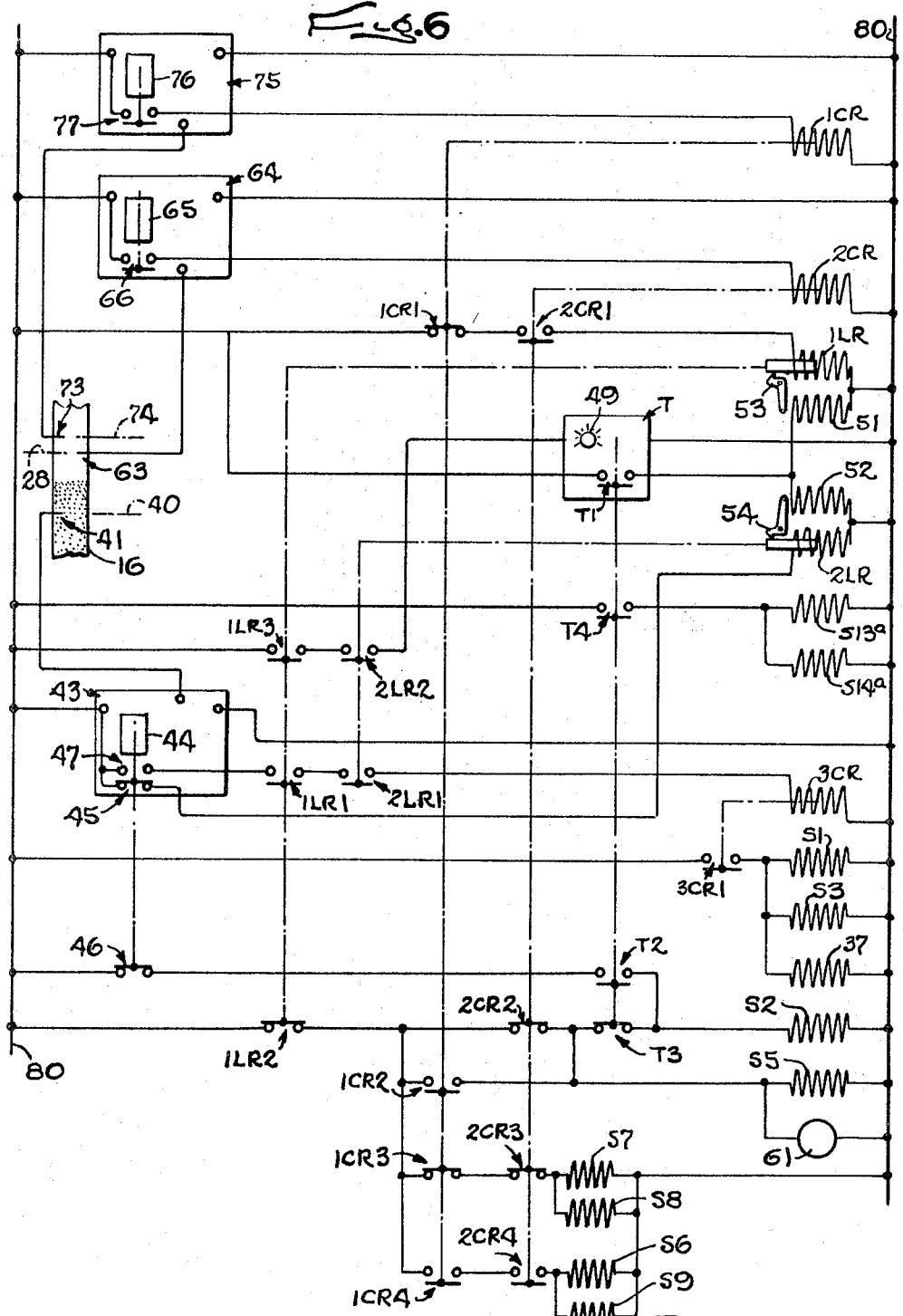

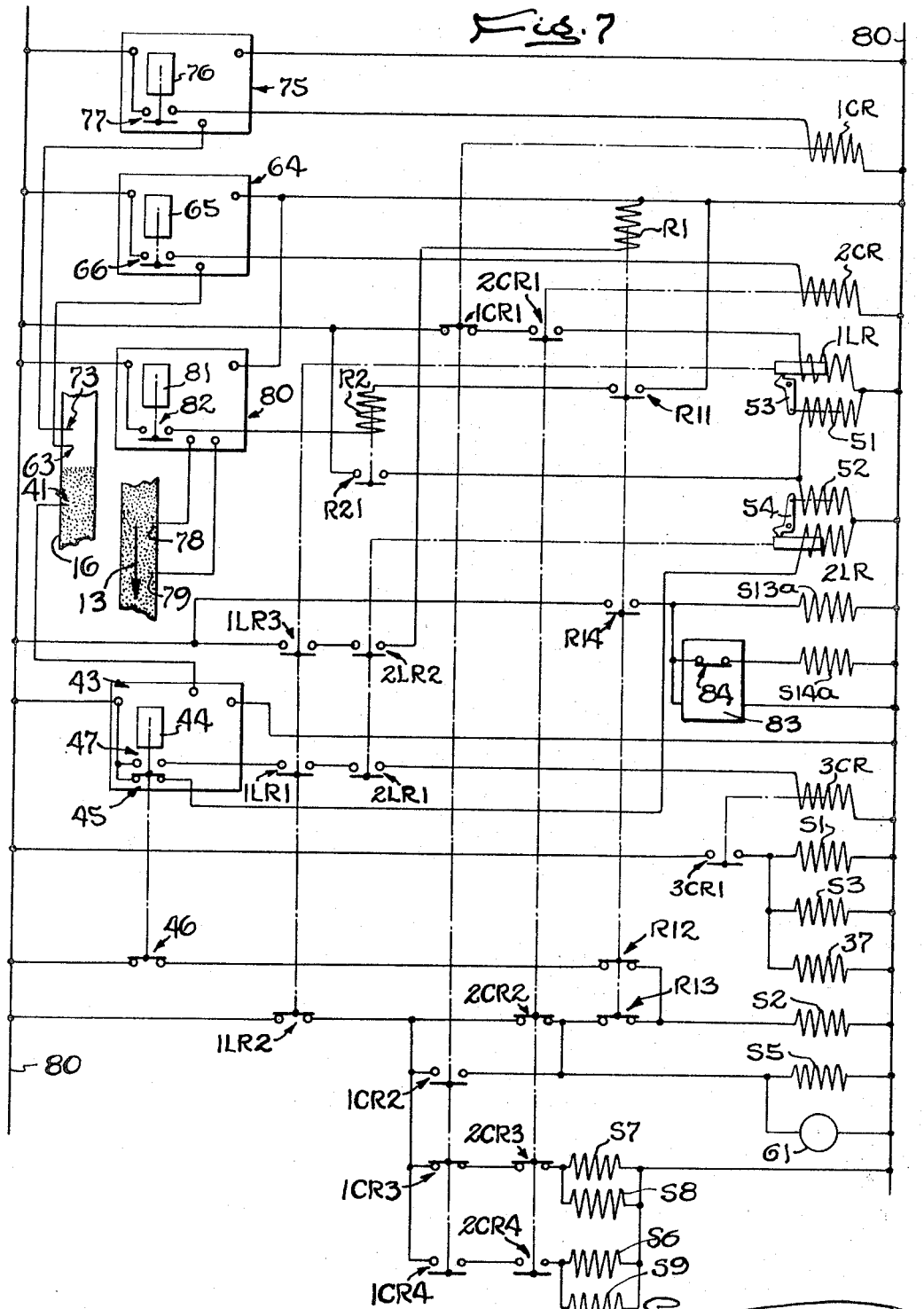

3,325,011
APPARATUS FOR MOVING ION EXCHANGE RESIN THROUGH A WORKING ZONE
Harold W. Keller, Rockford, Ill., assignor to Illinois Water Treatment Co., Rockford, Ill., a corporation of Illinois
Filed Apr. 19, 1966, Ser. No. 554,608
9 Claims. (Cl. 210—96)

This is a continuation-in-part of my copending application Ser. No. 205,723, filed June 27, 1962, now abandoned, and relates to apparatus utilizing granular ion exchange material or resin in various reactive capacities including ion exchange as in softening or deionizing of water, or in the separation of different solutes as in so-called ion exclusion (Pat. No. 2,684,331) or in ion retardation as described in publications of Dow Chemical Company.

More particularly, the invention relates to apparatus of the type disclosed in Higgins Pat. No. 2,815,322 in which a quantity of resin is confined in a body in a portion of a loop including a working or treating zone and a reconditioning or regenerating zone, and liquid to be treated is passed through the resin in the treating zone during repeated service cycles of controlled length while regenerating solution is passed through the resin in the reconditioning zone. Between successive service cycles, pressure is applied to one end of the column of resin to advance the column intermittently and step by step around the loop in one direction to periodically renew the resin in the treating zone and advances the exhausted resin from the treating zone into the reconditioning zone.

The general object of the present invention is to improve upon the Higgins system and obtain more effective and economical operation in service use.

A more specific object is to measure the extent of advance of the column during each step and thereby accurately control the amount of resin moved into and out of the treating zone to obtain optimum utilization of the resin in the treating zone and of the regenerating chemical in the reconditioning zone.

A further object is to sense changes in the volume of the resin in the loop and automatically remove and add resin to compensate for such changes, thereby maintaining a substantially constant volume of resin.

Another object is to correlate the stepping, resin removal and resin adding operations in a novel manner with the service cycles.

Still another object is to backwash the resin in another zone spaced around the loop from the treating and reconditioning zone for periodic removal of fine particles and accumulated foreign matter.

Other objects and advantages of the invention will become apparent from the following detailed description taken in connection with the accompanying drawings, in which FIGURE 1 is a schematic view of a liquid treating and resin moving system embodying the novel features of the present invention.

FIG. 2 is a similar but simplified view showing the positions of the parts after an advance of the resin body.

FIG. 3 is an enlarged section taken along the line 3—3 of FIG. 1.

FIGS. 4 and 5 are fragmentary schematic views illustrating the conditions requiring the addition of resin to or removal thereof from the transfer loop.

FIG. 6 is a schematic wiring diagram showing one control for the apparatus.

FIG. 7 is another wiring diagram of an alternate form of the control.

In the drawings, the invention is shown incorporated in a system for treating water or a water solution by ion exchange resin R confined in a tank 10 and adapted to be reconditioned in at tank 11 connected in series with the tank 10 in a closed loop around which the entire volume of resin is advanced intermittently in successive steps by applying a pressure medium to one end of a column 12 of the resin, herein in the side of the loop opposite the tanks. Treating of water or other liquid in a normal service cycle is effected by flowing the liquid vertically through the resin in the tank 10 along a path indicated at 13 while valves 13ª are open. In a similar way, regeneration of the spent resin or so-called stripping thereof for reuse in the tank 10 is effected while the resin is at rest in the tank 11. The regenerating solution may be forced vertically through the column along a path 14 and through open valves 14ª.

Preferably, the tanks 10 and 11 are arranged one above the other on one side of the loop and communicate through lateral or horizontal tubes 15 and 17 with the upper and lower ends of a tube 16 in which the column 12 of resin is confined between a lower valve 3 and an upper valve 2 spaced apart along the tube and adapted to control the flow of the granular resin through the tube. The valve 2 is preferably disposed a short distance below the junction of the cross tube 15 with the tube 16 which is extended upwardly as indicated at 19 to provide a chamber 20 in which the resin may be backwashed in a manner later described. A valve 1 is disposed in the pipe 15 close to the junction with the tube 16 so that all of the resin forced past this valve will gravitate down past the valve 2 when the latter is opened.

The valves 1, 2 and 3, a valve 4 between the tanks 10 and 11 and a valve 5 are of the butterfly type and arranged to be moved between fully open and closed positions by suitable power actuators herein shown as comprising a piston 22 coupled to the butterfly through a crank 23 and slidable in a cylinder 24. Opposite ends of the latter may be connected respectively to compressed air and exhaust lines 25 and 26 under the control of a valve 27 whose spring biased spool is shifted back and forth in response to energization and deenergization of an associated solenoid S, the butterfly valve being open when the solenoid is energized and closed automatically when the solenoid is deenergized. Since the valves 1 and 4 are open and closed together, their actuators may be controlled by a single solenoid as shown in FIG. 1. Typical actuators of this type are sold by Skinner Chuck Co. and identified as V9 Series four way solenoid valves.

During normal service operation, the loop comprising the tanks 10 and 11 and the tubes 15, 16 and 17 is filled with the resin as shown in FIG. 1 between a level 28 within the tube 16 and extending downwardly and laterally, then upwardly through the tanks 11 and 10 and laterally through the tube 15 to the valve 1. The voids in this resin and also the space within the tube 16 above the level 28 and in the chamber 20 are filled with water.

Means is provided for forcing a pressure medium, preferably water, into the tube 16 between the upper valve 2 and the normal level 28 while the valves 2, 13ª and 14ª are closed and the valves 1, 3 and 4 are open as shown in FIG. 2 to allow the resin column 12 to be forced downwardly and the entire body of resin to be advanced one step clockwise around the loop a desired distance, usually about twelve inches. This pressure-supplying means may take various forms, one simple form being a pump using compressed air as the motivating medium and comprising a piston 29 having a check valve 29ª therein and slidable in a cylinder 30 filled with water. The head end of the cylinder communicates through a pipe 30ª leading to the tube 16 between the level 28 and the valve 2. The rod end of the cylinder communicates through a pipe 31 with the upper end of the chamber 20 so that a volume of water corresponding to that forced into the tube 16 to advance the resin while the valve 2 is closed may flow into the rod end of the cylinder 30. Following the advance of the piston 29 and the resin around the loop, the valves 1 and 3 are closed and the valve 2 opened as shown in FIG. 1 to allow the resin forced past the valve 1 to gravitate down past the valve 2 and reform the column 12. At the same time, the piston 29 is retracted and water from the rod end of the cylinder flows freely through the check valve 29a.

The pumping piston 29 is moved back and forth by a solenoid controlled power actuator of the V9 series above described including a piston 32 connected to the rod 33 of the piston 29 and reciprocable in a cylinder 34 between limits determined by the adjustment of suitable stops (not shown). Motive fluid under pressure (compressed air) may be admitted alternately to opposite ends of the cylinder through a suitable spool valve 36 shifted between positions for advancing and retracting the piston 29 in response to energization and deenergization of a solenoid 37.

In accordance with the present invention, the movement of the resin body around the loop in response to activation of the pulsing pump 29, 30 is terminated when the upper end of the resin column 12 has been forced downwardly to an accurately defined level 40 determined by a device 41 operable automatically to sense the presence or absence of resin at this level. While such level sensing may be accomplished in different ways, for example photoelectrically, it is possible to achieve optimum simplicity and low cost of construction by using a control with a so-called conductivity probe capable of sensing the difference in conductance or resistance between the water above the resin in the tube 16 and a settled mixture of the resin and water. As shown in FIG. 3, the conductivity probe comprises two laterally spaced insulated electrodes 42 projecting through the wall of the tube 16 and disposed in a horizontal plane at the desired level 40. Through a suitable electronic amplifier 43 (FIG. 6) of the Wheatstone bridge type having an input energized in accordance with the resistance drop across the electrodes 42, a relay 44 in the amplifier output is normally deenergized and a switch 45 thereof is closed when the electrodes are immersed in water and the resistance drop (or conductance rise) is relatively low, for example, .010 mhos. In response to an increase in resistance, for example to .006 mhos. when the electrodes are immersed in resin only, the relay 44 is energized to open its switches 45 and 47 and close a switch 47. The amplifier 43 may be a so-called RE type Solu bridge sold by Industrial Instruments, Inc.

The pulsing cycles above described for advancing the resin step by step around the loop are initiated periodically at intervals determined by the desired length of the ion exchange or other treating operation performed in the tank 10 while the resin is at rest and the valves 13a are open. With the control illustrated in FIG. 6, a pulsing cycle is initiated automatically at the termination of a timed service cycle of predetermined length in response to the momentary closure of a switch T1 (FIG. 6) of a timer T which may be of the automatic reset type such as the HP5 Series sold by the Eagle Signal Company. Such timers are driven by a synchronous motor energized along with a clutch in response to closure of switches 1LR3 and 2LR2 closed by the energization of relays 1LR and 2LR and connected in series across the power leads 80. The switch T1 is closed momentarily after operation of the timer motor for an interval selected by manual adjustment of a knob 49 on the timer. Shortly thereafter, the timer motor and clutch are deenergized, permitting the switch operating mechanism to return automatically to starting position and remain there until the timer is again reenergized. The timer also operates a switch T2 which is opened as shown in FIG. 6 when the timer is at rest and reset, and is closed in the initial part of the timing period. A similar switch T3 is opened and closed when the switch is closed and opened respectively and a switch T4 is closed and opened simultaneously with the switch T2. During the resetting of the timing period after actuation of T1, the switches T2 and T4 are opened and T3 is closed as shown in FIG. 6 and remain in this condition while the reset timer is at rest. These switches control the energization of the solenoid S2 for operating the valve 2 under the various conditions described below. The switch T1 controls the energization of coils 51 and 52 which, when energized release latches 53, 54 which engage automatically when the associated relays 1LR and 2LR are energized and latch the armatures of these relays in actuated positions until the release coils are energized.

During the service cycles of the system above described the valves 13a, 14a, 90 and 91 are opened by solenoid controlled operators of the character above described so that the resin in the tank 10 performs the desired treating function on the liquid flowed therethrough, and the resin in the tank 11 is reconditioned by the liquid flowed through this tank. At the end of the service cycle, the solenoids of the valve actuators are deenergized under the control of the timer and the valves are reclosed and so maintained during the succeeding pulsing or resin transferring cycle.

While control of the length of the service cycle by the timer T provides an operable system, it will be evident that the length of the cycle necessarily is based upon an estimate of the average rate of flow of the liquid through the treating zone during the selected interval and a further estimate of the chemical action of that rate of flow of the particular liquid on the resin in the zone. Due primarily to changes in the liquid in service use, the estimated time often is either materially shorter or materially longer than the actual time required for exhaustion of the resin. Accordingly, the resin either becomes over-exhausted, that is, exhausted before the cycle is terminated, or remains partially unexhausted when it is advanced out of the treating zone. The first condition results in a failure to treat the liquid effectively after the resin is exhausted, while incomplete utilization of the resin results in increased down time for resin advancing and, more importantly, in the waste of regenerating chemicals.

To avoid the foregoing undesirable conditions, the timer control illustrated in FIG. 6 is replaced by the preferred control shown in FIG. 7 using a pair of conductivity probes 78 and 79 spaced apart along the flow path 13 of the treated liquid to sense when the condition of the resin in the tank 10 is such that the service cycle should be terminated and the resin advanced one step. One probe 79 is positioned in the resin in the treating zone approximately the length of one step, herein about twelve inches, from the outlet pipe drawing the effluent from the zone, and the other probe 78 is positioned upstream from the first probe, by the length of one or two steps of the resin. The probes are connected to another electronic amplifier 80 of the Wheatstone bridge type for comparing the conductances (or resistances) at the two probes. When the conductance at the upstream probe becomes substantially greater than the conductance at the other probe, for example, 1.2 times as much, the relay 81 of the amplifier is energized to close its normally open switch 82 and initiate termination of the service cycle in a manner similar to the action of the timer switch T1 in the form shown in FIG. 6.

Of course, the increasing conductance at the upstream probe 78 is a direct indication that the resin above the probe is approaching exhaustion and becoming ineffective to remove ions from the liquid. By placing this probe 2 or 3 step-lengths from the outlet end of the zone where fresh resin is added, there is sufficient length of active bed beyond the upstream probe to insure that the liquid leaving the zone will have been properly treated. Moreover, the resin leaving the opposite end of the treating zone one or more steps beyond the upstream probe is fully exhausted and ready to be advanced out of the treating zone for regeneration. With a timed cycle, a relatively small error in the selected length of the cycle can result in a serious out-of-phase condition over a period of time.

Another feature of the apparatus is the ability to predict within close limits the amount of regenerating chemical needed in the regenerating solution during each cycle, thereby avoiding waste of the chemical. With an accurately controlled amount of resin being advanced into the reconditioning zone 11 during each step, and with the resin being fully exhausted when the cycle is controlled by the probes 78 and 79 and the amplifier 80, all guesswork and approximation can be eliminated.

With the form shown in FIG. 6, the flow of regenerating solution is coextensive with the service cycle which, of course, is of constant length. With the preferred control in FIG. 7, however, the length of the service cycle varies for optimum utilization of the resin, so the duration of the flow of regenerating solution should be controlled independently, for example, by a timer 83 which terminates the regenerating flow after a preselected time interval calculated to provide the necessary amount of regenerating chemical. This time interval starts at the beginning of each service cycle but is short enough to insure that the timer will time out and open its switch 84 to stop regeneration before the service cycle ends.

Backwashing of the resin in the system to remove fine particles and accumulated foreign matter is preferably effected in a chamber spaced around the loop from the tanks 10 and 11 so that the washing may be carried on during the service cycle simultaneously with the treatment of liquid in the tank 10 and reconditioning of the resin in tank 11. Herein, this is accomplished in the chamber 20 by admitting water under pressure through a valve 90 and into the tube 16 just above the valve 2. The excess water thus admitted is caused to flow upwardly through the chamber 20 and escapes through valve 91 out of the top of the chamber and to a drain line. The valves 90 and 91 are actuated by solenoid controlled actuators the same as the valves previously described, and their solenoids are controlled by the same circuits as the valves 13a and 14a so as to be open during the service cycles and closed during the pulsing, resin adding, and resin removal operations.

With the arrangement described, the backwashing is initiated substantially simultaneously with the opening of the valve 2 to allow the resin beyond this valve to gravitate down the tube 16 and reform the column. By establishing the proper rate of up-flow of the backwash water into the tube through the valve 90, the backwashing does not interfere with the settling or gravitation of the heavy resin particles downwardly past the valve 2. This is to say, the fines and foreign matter are carried upwardly and out of the system through the valve 91 while ample time is allowed for the main body of the resin to settle down past the valve 2 before the latter is again closed as described below during the service cycle.

As a result of successive backwashings, the total volume of resin within the loop above described may be reduced sufficiently to lower the upper end of the column 12 to a point below the level 28 as shown in FIG. 4. In this condition of the system, the invention, in another of its aspects, contemplates adding resin from a source outside of the loop into the tube 16 above the closed valve 3 until the top of the column 12 has again been raised to the desired normal level 28. For this purpose, a supply 55 of the resin is contained in a tank 56 communicating with the tube at its lower end through a pipe 57 having a power operable valve 5 therein and normally closed at its upper end by a valve 58 which may be opened manually to admit resin into the tank from a supply hopper 59. Resin from the tank 56 is forced into the tube 16 by operation of a centrifugal pump 60 driven by a motor 61. By opening a normally closed power actuated valve 7, the pump outlet 70 is connected to a pipe 62 leading into the tank 56 above the resin therein. At this time, the inlet 71 of the pump is connected to the pipe 31 by opening a power actuated valve 8, similar associated valves 6 and 9 then being closed. In this condition, and with valves 2 and 5 open and valves 1 and 3 closed, the pump will, during operation of the motor, draw water out of the chamber 20 while forcing water through the pipe 62 into the tank 56 and in turn forcing resin out of the latter through the valve 5 and into the tube 16.

The cycle for adding resin to the column 12 is initiated in response to closure of a circuit controlled by device 63 for sensing the presence or absence of resin at the normal level 28. Preferably, this device, like the sensing device 41 above described, is a conductivity probe of the same construction as the latter and controlling the input to an electronic amplifier or RE Solu bridge 64 having a relay 65 by which a switch 66 is closed and opened respectively when the probe is immersed in resin and water.

As a result of an increase in the temperature of the resin body or for other causes including chemical reactions in the service operations of the system above described, the total volume of the resin in the loop may increase, resulting in a rise in the length of the column 12 above the desired normal level 28 as illustrated in FIG. 5 at the time when a pulsing cycle could normally be started. To insure movement of the desired accurately measured volume of resin past the probe 41 in the next pulsing cycle, the invention, in still another aspect, contemplates the automatic withdrawal of enough resin from the column 12 when a level 74 is reached to bring the upper end of the column down to the normal level 28. Such removal of resin from the loop is accomplished by operation of the pump 60 to force water into the chamber 20 and resin out of the tube 16 and into the tank 56 with the valves 1, 3, 7 and 8 closed and valves 2, 5, 6 and 9 open to connect the pump outlet 70 to the pipe 31 and the inlet 71 to the pipe 62 through the valve 6. The valves 6 to 9 may be operated by V9 type solenoid controlled actuators such as those described above, each valve being open when its solenoid is energized and closed automatically following deenergization of the solenoid.

As in the resin adding cycle, the need for removing resin from the loop to shorten the column 12 is preferably sensed by a probe 73 of the same construction as the probes 41 and 63 above described and located in the resin column at the level 74 close to and usually about an inch above the desired normal level 28. In this position, the probe will, during normal service operation of the system, be immersed in water only while the probes 41 and 63 are covered with resin and affect their amplifiers 43 and 64 so as to indicate a lower resistance as evidenced by energization of the relay windings 44 and 65.

The insulated leads of the probe 73 are connected across the input terminals of an amplifier 75 whose relay 76 is deenergized when the electrodes are immersed in water and energized to close a switch 77 in response to immersion of the probe in the lower resistance resin-water mixture. Thus, a rise in the column 12 to an obectionable level above the normal level 28 as shown in FIG. 5 is evidenced by closure of the switch 77 and energization of a relay 1CR. The amplifiers 64 and 75 are of the same construction as the amplifier 43 first described.

*Operation*

*Alternate pulse and service cycles.*—While the system above described is idle and the circuits are deenergized, the various relays will be deenergized and the switches positioned as shown in FIGS. 6 and 7. The operation of the two alternate forms of the control is similar except with respect to the manner of termination of the service cycle. The form shown in FIG. 6 will be described first, and the differences in the operation of the form in FIG. 7 then will be explained. Identical parts of the two controls are indicated by the same reference numbers.

Assuming that when power is applied to the circuits in FIG. 6, the system is executing a pulsing cycle during which the resin body is being advanced clockwise around the loop, the column being forced downwardly with the probes 63 and 73 immersed in water as shown in FIG. 6. At this time, the valve 2 is closed by virtue of deenergization of its solenoid S2 by the then open timer switch T2 and the switch 1LR2. Valves 1, 3 and 4 are open and the piston 29 is being advanced because of energization of the solenoids S1 and S3 and pump solenoid 37 by the relay 3CR through the switches 47, 1LR1 and 2LR1. At the asme time, the solenoids S13a and S14a are deenergized through the then open timer switch T4, the valves 13a and 14a then being closed.

When the top of the column passes below the level 40, the increase in resistance across the electrodes of the probe 41 due to exposure thereof to water alone deenergizes the relay 44 to close its switch 45 and energize the relay 2LR which becomes latched in. Opening of the switch 2LR1 breaks the previously energized circuit of the relay 3CR which opens its switch 3CR1 to deenergize the solenoids of the valves 1, 3 and 4 and the pump solenoid 37 thus closing these valves and reversing the pump 29, 30 to return the piston thereof to retracted position as permitted by the free flow of water through the check valve 29a.

At this time, the relay 2LR is energized through the then closed probe switch 45 and is latched and the relay 1LR, although deenergized, remains latched. With the switches 1LR3 and 2LR2 of these relays thus closed, a circuit is completed for energizing the clutch and motor of the timer T which is in reset condition with its switches T1, T2 and T4 open and T3 closed. A service cycle is initiated in the initial part of the timer period during which the timer reverses the condition of the switches T2, T3 and T4, closure of the latter energizing the solenoids S13a and S14a for opening the valves 13a and 14a to initiate the treating and reconditioning operations in the tanks 10 and 11. At the same time, the valves 90, 91 are opened and closed with the valves 13a and 14a to backwash the resin in the chamber 20 as above described. Closure of T2 completes a circuit to energize S2 and cause the valve 2 to be opened thus permitting the resin which was forced past the valve 1 in the previous pulse cycle to gravitate downwardly and reform the column 12. If no resin volume has been lost, the probe 41 will be covered in the final settling and the lower resistance then sensed by the probe 41 will cause the relay 44 to be reenergized thus reclosing its switch 47 and opening switch 45.

The service cycle continues, usually for several minutes, until the timer opens its switch T1 momentarily thus completing circuits for energizing the coils 51 and 52 for retracting the latches of the relays 2LR and 1LR, the latter however remaining energized through the switches 1CR1 and 2CR1 which are then maintained closed as a result of exposure of the probes 41 and 63 to water and resin respectively. Release of the relay 2LR opens 2LR2 thus deenergizing the timer which returns immediately to starting position and resets itself with its switches T1, T2 and T4 open and T3 closed. The opening of T2 deenergizes the solenoid S2 to close the valve 2 while the service valves 13a and 14a are closed in response to the opening of T4. Assuming that no substantial amount of resin was lost in the previous service cycle, the column 12 will be restored to the level 28 thus immersing the probe 41 and 63 in resins.

The circuits are now conditioned for starting another pulse cycle. Thus the relay 3CR is now energized through the closed switches 47, 1LR1 and 2LR1 thus closing 3CR1 to cause the valves 1, 3 and 4 to open and energizing the solenoid 37 to initiate the advance of the pump piston 29 by its actuator. In view of the opening of the switches 1LR2 and T2, the valve 2 remains closed so that the water forced into the tube 16 pushes the column 12 downwardly and the entire body of resin clockwise around the loop, some of the resin being forced past the valve 1 into the chamber 20 above the valve 2. As the top of the resin column 12 moves below the probe 63, the amplifier relay 65 becomes deenergized thus deenergizing 2CR to open the switch 2CR1, the relay 1LR remaining held in energized position by the latch 53. The pulse cycle then continues until the resin has been lowered just below the probe 41 whereupon the cycle is terminated as first described above.

*Resin adding cycle.*—Assuming now that, as a result of the backwashings or for other causes, the volume of resin in the loop has been reduced so that the top of the column 12 is disposed below the probe 63 at the end of the service cycle. The relay 2CR will thus be deenergized and with its switches 2CR2 and 2CR3 closed and its switches 2CR1 and 2CR4 open at the time when the timer switch T1 is opened to release the latches 53, 54. The resulting movement of the plunger of the relay 1LR opens the switch 1LR3 to deenergize the timer and allow resetting thereof to starting position including the closure of T3. By contrast with the starting of a normal pulse cycle, the valves 1, 3 and 4, remain closed as a result of the open position of the switch 1LR1 while the solenoid S2 is energized through 1LR2, 2CR2 and T3 thus opening the valve 2. At the same time, the solenoid S5 is energized through 1LR2 and 2CR2 and along with the motor 61 for driving the pump 60. Also, with both of the probes 63 and 73 immersed in water, the resulting simultaneous closure of switches 1CR3 and 2CR3 energizes the solenoids S7 and S8 to open valves 7 and 8. The water drawn through the valve 8 by the pump 60 from the pipe 31 is forced through the valve 7 and into the tank 56 thus forcing resin from the latter through the valve 5 and pipe 57 into the tube 16 above the valve 3 to thereby lengthen the column 12. This movement continues only until the resin level has risen to and covers the probe 63 whereupon the relay 65 and its associated relay 2CR are energized thus reversing the condition of the switches of the latter. As a result, the circuits for the solenoids S2, S5, S7 and S8 and the pump motor are broken to interrupt the resin adding movement.

With the valves 2 and 5 reclosed, the system is conditioned for resumption of a pulsing cycle which is then initiated as a result of energization of the relay 1LR through switch 2CR1 and the resulting closure of the switch 1LR3 to start the timer T. The pulse cycle then proceeds and is terminated in the manner described above when the resin in the loop has passed the lower probe 41.

*Resin removing cycle.*—Resin is removed from the tube 16 automatically at the end of the service cycle and in the event that the total volume in the loop has expanded enough to raise the level of the column 12 up to or above the probe 73 causing 1CR to be energized, its switches 1CR1 and 1CR3 to open and its switches 1CR2 and 1CR4 to close. Since the probe 63 is also immersed in resin, the relay 2CR is also energized at this time. As a result, the solenoids S5, S6 and S9 and the pump motor 61 are energized through the then closed switch 1LR2 and switches 1CR2 and 1CR4. At the same time, valve 2 is opened by energization of its solenoid through 1LR2, 1CR2 and T3. The pump thus draws water out of the top of the resin supply tank 56 and delivers the same through the pipe 31 into the chamber 20 to apply a downward pressure to the top of the resin column 12. This forces resin out of the tube 16 above the valve 3 and into the tank 56 through the pipe 57 and the valve 5 to thereby shorten the column 12. When the top of the resin in the column has been lowered below the probe 73 so as to immerse the latter in water only, the relay 1CR is deenergized. Reclosure of the switch 1CR1 thereof reenergizes the relay 1LR through 2CR1 and opening switches 1CR2 and 1CR4 deenergizes S2, S5, S6 and S9 and the pump motor thus reclosing valves 2, 5, 6 and 9 and stopping the pump.

The system is now conditioned for starting a pulse cycle which is initiated as described above by the energization of 3CR through switches 47, 1LR1 and 2LR1. As in a normal pulsing cycle, the cycle continues until the resin column 12 has been forced down below the probe 41.

*Preferred control of resin movement.*—It will be seen in FIG. 7 that the timer T and its switches T2–T4 have been replaced by a conventional relay R1 having switches R11–R14. Switches R12–R14 perform the same functions as the timer switches T2–T4, while R11 is in the circuit of a second relay R2 having a normally open switch R21 in the circuit of unlatching coils 51 and 52. Thus switch R11 indirectly controls these coils, and relays 1LR and 2LR, where the timer switch T1 operated directly on the coils.

With the apparatus in operation, assuming that a service cycle has just been started, relays 1LR and 2LR will be latched in, energizing relay R1 to close switch R11 in the circuit of relay R2. Switch R21 remains open, however, because the conductance at the probes 78 and 79 will be very close to equal. The relay 81 thus is deenergized and the relay switch 82 is open. Accordingly, the cycle continues in the manner previously described with respect to FIG. 6. After the predetermined interval selected for operation of the timer 83 controlling the flow of regenerant, the timer times out and opens its switch 84 in the circuit of solenoids S14ᵃ to close valves 14ᵃ and terminate regeneration. The solenoids S13ᵃ remain energized to continue the service cycle.

As the resin above the upstream probe 78 nears exhaustion, the conductance at the probe increases relative to that at the lower probe 79 until the difference is sufficient to cause closing of the switch 82. This completes the circuit through relay R2 which closes its switch R21 to energize coils 51 and 52 and unlatch the relays 1LR and 2LR, thereby initiating termination of the service cycle and preparing the circuits for another pulse cycle, as before. When the top of the resin column 12 moves below the probe 41 and the level 40, relay 44 is deenergized to energize relay 2LR to initiate another service cycle.

It will be apparent that through the use of the level sensing devices 63 and 73 located as described, above and at the upper end of the resin column, the column length is adjusted automatically from time to time so that each pulsing cycle is started with the column always of the same length. This, combined with the termination of each cycle with the resin at a predetermined lower level controlled by the level sensor 41, effectively equalizes the successive lengths of advance of the resin body and the volumes transferred into the tanks 10 and 11 in the successive pulsing cycles. Moreover, the initiation of pulsing in response to the sensed change in the condition of the resin insures that the resin is advanced when needed but not before. These factors make for most efficient use of the resin and the reconditioning chemical in the service cycle as well as most effective treatment of the liquid. As a consequence, optimum capacity and effectiveness in service use are achieved for a given volume of resin contained in the system.

I claim as my invention:

1. In apparatus of the character described, the combination of, means defining an endless tubular upright loop including an upright tube communicating with a lateral opening near the top of said loop, an upper valve in said tube below said opening, a body of granular ion exchange material filling the major length of said loop and extending from a first normal predetermined level spaced below said valve downwardly and then upwardly around the loop to said opening and defining a chamber between said opening and said normal level, the voids in said material and in said chamber being filled with water, a lower valve in said loop spaced below said normal level, pulsing mechanism operable when said lower valve is open and said upper valve is closed to introduce a pressure medium into said tube below the upper valve and thereby push said material downwardly and move all of the material around said loop and part thereof past said opening and into said chamber, a device for sensing the presence or absence of said material in said tube during such movement at a predetermined second level spaced below said first level but above said lower valve, means controlled by said device and controlling said pulsing mechanism to interrupt the flow of said pressure medium into and the movement of the material around the loop when the upper end of the column of said material in said tube is lowered to said second level, operating mechanism holding said upper valve closed and said lower valve open during movement of said material and then reversing the condition of said valves whereby the material delivered into said chamber during the transfer is held by the upper valve until said movement is terminated and then is released to said upper end to restore the latter to said first level, a third valve controlling the flow through said opening, means for maintaining said third valve open while said material is being transferred around said loop, through said opening and into said chamber above the closed upper valve, and mechanism operable while said material is disposed in said chamber and said third valve is closed to force water into the chamber above the closed upper valve and upwardly and outwardly through an outlet in the upper end of the chamber whereby to backwash the material in the chamber.

2. Apparatus as defined in claim 1 having means establishing a rate of flow of the backwash water upwardly through said outlet sufficient to carry extremely fine particles of said material through said outlet while maintaining the remainder of the material in said chamber.

3. In an apparatus of the character described, the combination of, means defining an endless tubular loop including a pair of spaced upright portions communicating with each other at both ends through upper and lower lateral portions of the loop, a body of granular ion exchange material filling part of said loop and extending from one end at a first level in one of said upright portions downwardly and around the lower portion of the loop and then upwardly in the other upright portion and across the upper lateral portion of said loop, an upper valve in said loop above said first level, a second valve in said loop beyond said first level, the voids in said material and the remainder of the loop being filled with water, mechanism operable when said second valve is open and said upper valve is closed to deliver a pressure medium into said loop below the upper valve and thereby push said body downwardly in said one portion and move all the material around the loop thereby feeding material from said upper lateral portion into said one upright portion, means sensing the extent of movement of said one end of the body of material and terminating the delivery of said pressure medium when said one end has been moved to a preselected second level below said first level, means operable to close said upper valve and open said lower valve prior to delivery of said pressure medium to said tube, and to reverse the conditions of said valves after said one end reaches said second level and the movement is stopped whereby the material fed into the said one upright portion first is retained by the closed upper valve during sensing of movement of said one end and then is released to said one end, means operable after release of the material to said one end to detect a fall of said one end to a level below said first level, and mechanism controlled automatically by said detecting means after detection of a fall to force an additional volume of material into said loop and raise said one end to said first level.

4. In an apparatus of the character described, the combination of, means defining an endless tubular loop including a pair of spaced upright portions communicating with each other at both ends through upper and lower lateral portions of the loop, a body of granular ion exchange material filling part of said loop and extending from one end at a first level in one of said upright portions downwardly and around the lower portion of the loop and then upwardly in the other upright portion and across the upper lateral portion of said loop, an upper valve in said loop above said first level, a second valve in said loop below said first level, the voids in said material and the remainder of the loop being filled with water, mechanism operable when said second valve is open and said upper valve is closed to deliver a pressure medium into said loop below the upper valve and thereby push said body downwardly in said one portion and move all the material around the loop, thereby feeding material from said upper lateral portion into said one upright portion, means sensing the extent of movement of said one end of the body of material and terminating the delivery of said pressure medium when said one end has been moved to a preselected second level below said first level, means operable to close said upper valve and open said second valve prior to delivery of said pressure medium to said tube, and to reverse the conditions of said valves after said one end reaches said second level and the movement is stopped whereby the material fed into said one upright portion first is retained by the closed upper valve during sensing of movement of said one end and then is released to said one end, means operable after release of the material to said one end to detect a rise of said one end above said first level, and mechanism controlled automatically by said last mentioned means after detection of said rise to withdraw from said loop a volume of material sufficient to restore said one end to said first level.

5. In an apparatus of the character described, the combination of, means defining an endless tubular loop having a treating section, a column of granular ion exchange resin partially filling said loop and extending through said treating section, the voids in the resin and the remaining portion of said loop being filled with water, means for intermittently advancing the column step by step in one direction around the loop to move new lengths of the resin into said treating section, said column having one end normally disposed at a first predetermined level and movable toward a second predetermined level during movement of the column in said one direction, and having a second end from which resin is displaced to return to said one end during the advancing of said column, means in said loop spaced above said first predetermined level for retaining resin displaced from the other end of said column during the advancing of the column thereby preventing the addition of the resin to said one end, means for sensing the arrival of said one end at said second level, means controlled by said sensing means and operable to interrupt movement of said column when said one end reaches said second level, thereby accurately controlling the extent of advance of the column during each step, and mechanism operating said retaining means to release the displaced resin to said one end after arrival of said one end at said second level.

6. Apparatus as defined in claim 5 including means operable after release of the displaced resin to said one end to detect a fall of said one end to a level below said first level, and mechanism controlled automatically by said detecting means after detection of a fall to force an additional volume of resin into said loop and raise said one end to said first level.

7. Apparatus as defined in claim 5 including means operable after release of the displaced resin to said one end to detect a rise of said one end above said first level, and mechanism controlled automatically by said last mentioned means after detection of said rise to withdraw from said loop a volume of resin sufficient to restore said one end to said first level.

8. Apparatus as defined in claim 5 including means operable after release of the displaced resin to said one end to detect a variation in the level of said one end from said first level, and mechanism controlled automatically by said detecting means to restore said one end to said first level.

9. Apparatus as defined in claim 5 in which said retaining means is a first valve for selectively opening and closing said loop above said first level and further including a second valve for closing said loop above said first valve, said loop having an outlet above said first valve, and means for forcing a controlled flow of backwashing fluid through the displaced resin and out through said outlet thereby to carry out relatively fine particles that have separated from the resin in the loop and accumulated foreign matter.

References Cited
UNITED STATES PATENTS

| | | | |
|---|---|---|---|
| 2,671,714 | 3/1954 | McIlhenny et al. | 210—33 X |
| 2,810,692 | 10/1957 | Calmon | 210—108 X |
| 2,815,322 | 12/1957 | Higgins | 210—189 X |
| 3,056,743 | 10/1962 | Eichorn et al. | 210—189 X |
| 3,193,498 | 7/1965 | Platzer et al. | 210—189 X |
| 3,194,663 | 7/1965 | Higgins | 210—96 X |

REUBEN FRIEDMAN, *Primary Examiner.*

C. M. DITLOW, *Assistant Examiner.*